United States Patent [19]

McKenzie

[11] Patent Number: 4,469,518

[45] Date of Patent: Sep. 4, 1984

[54] FLUID LOSS ADDITIVE

[75] Inventor: Lee F. McKenzie, Arlington, Tex.

[73] Assignee: Hughes Tool Company, Houston, Tex.

[21] Appl. No.: 523,253

[22] Filed: Aug. 15, 1983

Related U.S. Application Data

[62] Division of Ser. No. 388,334, Jun. 14, 1982, Pat. No. 4,413,681.

[51] Int. Cl.$^3$ .................................................. C04B 7/35
[52] U.S. Cl. ........................................ 106/90; 106/314
[58] Field of Search ................................... 106/90, 314

[56] References Cited

U.S. PATENT DOCUMENTS

| | | | |
|---|---|---|---|
| 3,234,154 | 2/1966 | Martin | 260/17.5 |
| 3,302,716 | 2/1967 | Williams | 166/31 |
| 3,491,049 | 1/1970 | Gibson et al. | 160/29.2 |
| 3,493,529 | 2/1970 | Krottinger et al. | 260/29.6 |
| 3,511,314 | 5/1970 | Scott et al. | 166/293 |
| 4,036,660 | 7/1977 | Persinski et al. | 106/90 |

*Primary Examiner*—James Poer
*Attorney, Agent, or Firm*—Robert A. Felsman; Charles D. Gunter, Jr.

[57] ABSTRACT

A fluid loss additive and method are shown for use in cementing oil and gas well bores which comprises the reaction product of a polyamine compound and a high molecular weight sulfonated polymer. The polyamine and high molecular weight sulfonated polymer are prereacted in solution and dried to form a dry product which can be added to the dry cement blend on the shelf or added to the mixing water during the formation of the cement slurry at the well site. The prereacted additive is effective to control fluid loss in cement slurries at 350° F. and higher.

5 Claims, No Drawings

FLUID LOSS ADDITIVE

This application is a division of application Ser. No. 388,334, filed June 14, 1982, now U.S. Pat. No. 4,413,681.

BACKGROUND OF THE INVENTION

This invention relates generally to oil well cementing compositions and specifically to an additive for such compositions and method of making the same for controlling fluid loss during cementing operations.

Cement compositions are used in the oil and gas industry to cement the annular space in the well bore between the surrounding formation and pipe or casing. In a typical operation, the cement slurry is pumped down the inside of the casing and back up the outside of the casing through the annular space. The amount of water which is used in forming the cement slurry will vary depending upon the type of hydraulic cement selected and the job conditions at hand. The amount of water used can vary over a wide range dependent in large measure upon the consistency of the slurry required and upon the strength requirement for the particular job. In many cases, the hydraulic cement must be placed within or next to a porous medium, for example, the earthern strata in the well bore. When this happens, the water tends to filter out of the slurry and into the strata during the setting of the cement. Many difficulties are attendant with uncontrolled fluid loss of this type such as uncontrolled setting rate, improper placement of the slurry, impaired strength properties, and contamination of the surrounding strata. These conditions are all undesirable in oil and gas well cementing operations.

In order to lessen the loss of fluid from the aqueous cement slurry, various materials have been employed in the past. The use of polyamine compounds selected from the class consisting of polyalkylenimines, polyalkylenepolyamines and mixtures thereof is taught in U.S. Pat. No. 3,491,049 to Gibson et al, issued Jan. 20, 1970. However, polyamines do not generally function as fluid loss additives when used alone but must be synergized with a companion material, typically one of the so-called "dispersant" materials. In the 3,491,049 patent, a sulfonated naphthalene condensate dispersant is used as an additional additive to the cement slurry which cooperates with the polyamine additive to provide satisfactory fluid loss in cement slurries used at about 200° F. and below. The sulfonated polymer dispersants are typically low molecular weight materials, e.g., in the range of about 1,000 to 3,000.

Sulfonated polystyrene has also been used in the past as a fluid loss additive for cement compositions. Thus, U.S. Pat. No. 3,234,154 to Martin, issued Feb. 8, 1966, teaches the use of a sulfonated polystyrene polymer having a molecular weight in the range of 300,000 to 4,000,000. The sulfonated polystyrene is used in conjunction with a lignin amine derivitive. The use of a polyamine is not taught.

U.S. Pat. No. 3,511,314 to Scott, Jr., et al, issued May 12, 1970, teaches the use of the reaction product of a polyamine and "an acidic compound selected from the class consisting of carboxylic acids, sulfonic acids, polymers having a carboxyl substituent, and polymers having a sulfonate substituent" as fluid loss additives for cement slurries. The acid component is once again identified as the condensation product of a mononaphthalene sulfonic acid and formaldehyde. The condensation product is thus a low molecular weight dispersant type compound, i.e., in the range of 1,000 to 3,000. The use of a high molecular sulfonated polymer is not taught. The fluid loss additive is used in the examples in the temperature range of 200° F. and below.

SUMMARY OF THE INVENTION

It has now been discovered that a novel fluid loss additive can be provided for oil well cement compositions which comprises the reaction product of a polyamine and a high molecular weight sulfonated polymer where the polyamine and the sulfonated polymer are prereacted in solution and then dried to form the additive. The high molecular weight sulfonated polymer has a molecular weight in the range of about 500,000 to 8,000,000. The polyamine compound is selected from the group consisting of polyalkylenepolyamines, polyalkylenimines, and mixtures thereof. Preferably, the high molecular weight sulfonated polymer is a polysulfonated polystyrene having a molecular weight on the order of 6,000,000.

A method of cementing a well bore is also shown which comprises the steps of mixing together a hydraulic cement, water in an amount sufficient to produce a pumpable slurry, and a fluid loss additive which comprises the reaction product of a polyamine compound selected from the group consisting of polyalkylenepolyamines, polyalkylenimines, and mixtures thereof, and a high molecular weight sulfonated polymer where the sulfonated polymer has molecular weight in the range of 500,000 to 8,000,000. The reaction product is formed by prereacting the high molecular weight sulfonated polymer and the polyamine compound in solution and drying the product to form a dry additive. The cement composition is then pumped to the desired location in the well bore and allowed to harden to a solid mass.

Additional objects, features, and advantages will be apparent in the description which follows.

DETAILED DESCRIPTION OF THE INVENTION

The term "hydraulic cement" is meant to encompass any inorganic cement that hardens or sets underwater. Hydraulic cements, for example, include Portland cement, aluminous and pozzolan cement, and the like. The term "hydraulic cement" is also intended to include cements having minor amounts of extenders such as bentonite, gilsonite, and also is intended to include cements used either without any appreciable sand or aggregate material or such cements and admixed with a granular filling material such as sand, ground limestone, and the like. Thus, for example, any of the Class "A-H" and "J" cements as listed in the "API Spec. 10 First Edition, January 1982" are suitable for this purpose. Strength enhancers such as silica power can also be employed.

Mixing water is utilized with the dry cement component to produce a fluid pumpable slurry of suitable consistency. "API Spec. 10 First Edition, January 1982", which is known in the cement industry, describes an approved apparatus and method for measuring the consistency of cement slurries in terms of Bearden units of consistency (Bc). A pumpable slurry should measure in the range of about 2–20 Bc, and preferably be in the range of 5 to 11 Bc. Slurries thinner than 5 Bc will tend to have greater particles settling and free water generation. Slurries thicker than about 11 Bc become increasingly difficult to pump.

Depending on the particular slurry and intended conditions of use, mixing water is utilized in the slurry of the present invention in the range of about 30 to 150 weight percent based on the weight of dry cement and preferably is in the range of 35 to 90 weight percent.

The present cement compositions in addition to hydraulic cement and water in a sufficient amount to produce a pumpable slurry include a fluid loss additive which comprises the reaction product of a polyamine and a high molecular weight sulfonated polymer, said polyamine and said sulfonated polymer being prereacted in solution and then dried to form said additive. The first reaction constituent is a polymer having a high degree of amine character i.e., a polyamine. By the term "polyamine" is meant a material selected from the class consisting of polyalkylenepolyamines, polyalkylenimines, and mixtures thereof.

The polyamine compound employed in the practice of the invention should have an average molecular weight of at least about 400, and preferably at least about 1,400. Larger average molecular weights, however, are more preferred, e.g., ranging from about 40,000 to 100,000 or even higher. Specific methods for preparing polyamine compounds suitable for practice of the present invention, such as polyethylenimine are known in the art. The polyalkylenimines include, for example, polymerized ethylenimine or propylenimine. Similarly, the polyalkylenepolyamines include, for example, polyethylene and polypropylene-polyamines.

The general method of preparing polyalkylenimines comprises (1) mixing together an alkylenimine, a vicinal-dihaloalkane as a catalyst or initiator, an alkali metal salt and a solvent and (2) heating the continuously stirred mixture to accelerate polymerization of the alkylenimine monomer, and subjecting the reaction mixture to a shearing force during the polymerization reaction period. The alkylenimines most commonly polymerized in this manner are ethylenimine and propylenimine.

The general method of preparing the higher molecular weight polyalkylenepolyamines is to react one or more polyalkylenepolyamines with a vicinal-dihaloalkane by (1) mixing together a solution of a polyalkylenepolyamine a vicinal-dihaloalkane, and an alkali metal salt, (2) heating the mixture while it is continuously stirred, and (3) subjecting the reaction mixture to a shearing force as in the preparation of the polyalkylenimines, during the reaction period. For further information, the reader is referred to U.S. Pat. No. 3,491,049 to Gibson, et al issued Jan. 20, 1970.

A suitable polyamine is commercially available from Cordova Chemical Company of Sacramento, Calif., as Corcat P-600. The material is supplied as a 33% aqueous solution of polyethylenimine which is 33% solids, which has a viscosity (CP at 25° C.) of less than 5,000, a specific gravity at 25° C. of 1.04 to 1.06, and a pH of 10–11. The molecular weight range of the material is 40,000 to 60,000. Branching during polymerization of the material leads to approximately 30% primary, 40% secondary, and 30% tertiary amines in the product.

The second reaction constituent which is reacted with the polyamine material to produce the present fluid loss additive is a high molecular weight long chain or branched sulfonated polymer such as sulfonated polystyrene or sulfonated polyvinyltoluene, preferably in the water soluble salt form. The present high molecular weight sulfonated polymer is to be distinguished from the low molecular weight sulfonated dispersants used in the past such as the formaldehyde condensed sulfonated naphthalene type materials which had molecular weights between about 1,000 and 3,000 and preferably between about 1,500 and 2,000. The present high molecular weight sulfonated polymer has a molecular weight in the range of about 500,000 to 8,000,000. The preferred sulfonated polymers are high molecular weight sulfonated polymers selected from the group consisting of polysulfonated polystyrene and polysulfonated vinyltoluene having molecular weights in the range of about 500,000 to 8,000,000. The most preferred sulfonated polymer is polysulfonatedpolystyrene having a molecular weight on the order of 6,000,000.

A preferred sulfonated polymer which is suitable for the present purpose is commercially available from Proctor Chemical Company, Inc. of Bridgewater, N.J., as Versa-TL 600. The material is a mixture of the acid form of sodium polystyrene sulfonate which is stabilized with 9% to 10% sodium carbonate. The material is soluble in water and lower glycols, has a pH of 4–8, a bulk density of 26 pounds/cubic foot, and has a 6% maximum moisture content. The molecular weight of the sulfonated polymeric material is on the order of 6,000,000.

The present fluid loss additive, as distinguished from prior additives which used either a polyamine or a sulfonated polymer or an admix of the two, is the reaction product of a polyamine reactant and a high molecular weight sulfonated polymer reactant. The reaction product is formed by prereacting the high molecular weight sulfonated polymer with the polyamine compound in solution and drying the product to form the additive.

The reaction ratio by active weight of high molecular weight sulfonated polymer to polyamine is generally in the range of from 1:2 to 10:1. The preferred reaction ratio by active weight of the two preferred reactants is approximately 20 grams of high molecular weight sulfonated polymer to 10 grams (30 mL of 33% aqueous solution) polyamine. Of course the ratio of the reactants will, in part, be based upon the particular reactants chosen, their molecular weight, the degree of branching or cross-linking, etc. Generally speaking, too much polyamine results in a liquid product. Too much high molecular weight sulfonated polymer decreases the fluid loss characteristics of the product.

In the method of cementing a well bore with the present additive, a hydraulic cement, water, and the prereacted fluid loss additive are mixed together to form a pumpable slurry. The fluid loss additive is generally present in the slurry in the range of about 0.1 to 3.0 precent by weight of cement and preferably in the range of about 1.0 to 1.5 percent by weight of dry cement. Since the fluid loss additive is a dry product, it can be present in the dry cement blend on the shelf or can be added to the mixing vessel at the well site. The cement slurry so prepared is then pumped to the desired location in the well bore and allowed to harden to form a solid mass.

The following examples are intended to be illustrative of the invention:

EXAMPLE

Twenty grams of Versa-TL 600 sulfonated polystyrene (molecular weight 6,000,000) was hydrated in 400 mL of water in a container. Next, 30 mL of Corcat P-600 (33% aqueous solution of polyethylenimine) was added to the container while mixing continuously. The solution was dried overnight at approximately 100° C. The dried product was then ground in a ball mill to a powder to form the dry additive of the invention. A number of exemplary cement slurries were then formed using the dry additive, Trinity Class H cement, water, and various standard high temperature retarders. Silica flour was also added in certain of the formulations for greater strength. The consistency, free water, fluid loss, and thickening time tests were performed in accordance with the standard procedures contained in the "API Spec. 10 First Edition, January 1982". The results are shown in Table 1. The tests results indicate that the cement compositions prepared using the fluid loss additive of the invention exhibit excellent fluid loss characteristics up to at least 350° F. The fluid loss, free water, thickening time, and consistencies of the slurries are all within acceptable limits.

The following abbreviations are used in Table 1:

| Abbreviation | Meaning |
|---|---|
| SF | Silica Flour |
| BR1 | Blended retarder containing a lignosulfonate, a borate, glucono delta lactone, and carboxymethyl cellulose |
| BR2 | Blended retarder like BR1 but without borates |
| SB | sodium borate (borax) |
| CC | calcium chloride |
| AHC | aluminum hydroxychloride |
| XX | fluid loss additive of the invention |

One sack of cement in Table 1 contains approximately 94 pounds of cement. The weight percentages are based on the weight of dry cement.

tion can be used to provide a cement slurry with desirable fluid loss characteristics at temperatures as high as 350° F. and even higher. The resulting additive produces greatly improved results over the use of polyamines or sulfonated polystyrene alone. The novel additive is also superior to fluid loss additives comprising the reaction product of a polyamine compound with a low molecular weight sulfonated polymer of the dispersant type.

While the invention has been shown in only one of its forms, it is not thus limited but is susceptible to various changes and modifications without departing from the spirit thereof.

I claim:

1. An aqueous hydraulic cement composition of the type used in oil well cementing operations and settable to a solid mass, comprising:
   cement;
   water present in a sufficient amount to produce a pumpable slurry; and
   a fluid loss additive comprising the reaction product of a polyamine compound selected from the group consisting of polyalkylenepolyamines, polyalkylenimines, and mixtures thereof and a high molecular weight sulfonated polymer, said sulfonated polymer having a molecular weight in the range of 500,000 to 8,000,000, said polyamine and said high molecular weight sulfonated polymer being prereacted in solution and then dried to form said additive.

2. The cement composition of claim 1, wherein said high molecular weight sulfonated polymer has a molecular weight on the order of 6,000,000.

3. The cement composition of claim 2, wherein said sulfonated polymer is polysulfonated polystyrene.

4. The cement composition of claim 3, wherein said polyamine compound is polyethylenimine.

5. The cement composition of claim 1, wherein said fluid loss additive is present in the range of 0.1 to 2.5 percent by weight of said cement.

TABLE 1

| Test | Cement Class | Mix | Water Wt. % | SF % | BR1 % | BR2 % | SB | CC | AHC | XX | Consistency Bc | % Free Water 197° F.–350° F. | Consistency Bc | Fluid Loss 197° F.–350° F. | | Thickening Time/Hrs:Min |
|---|---|---|---|---|---|---|---|---|---|---|---|---|---|---|---|---|
| 1 | H | 1:0:0 | 50.25 | 35 | 1.6 | | | | | 1.5 | 8 | 0.4 | 12 | 24 | 30 | |
| 2 | H | 1:0:0 | 50.25 | 35 | | 1.5 | 2.25 | | | | 7 | 3.2 | | | | |
| 3 | H | 1:0:0 | 50.25 | 35 | | 1.5 | 2.25 | | | 1.5 | | | 7 | 30 | 107 | |
| 4 | H | 1:0:0 | 50.25 | 35 | 1.6 | | | | | 1.5 | 11 | 0 | | | | |
| 5 | H | 1:0:0 | 50.25 | 35 | 1.6 | | | | | 2.0 | 15 | 0 | | | | |
| 6 | H | 1:0:0 | 50.25 | 35 | | | | 0.5 | | 1.5 | 9 | 0 | | | | |
| 7 | H | 1:0:0 | 50.25 | 35 | 1.6 | | | | 0.2 | 1.5 | 8 | 0 | 11 | 15 | 70 | |
| 8 | H | 1:0:0 | 50.25 | 35 | 1.6 | | | | | 1.5 | 10 | 0 | 13 | 20 | 63 | |
| 9 | H | 1:0:0 | 50.25 | 35 | 1.6 | | | | | 1.5 | 9 | 0 2.0 | 13 | 26 | 34 | 4:27 |
| 10 | H | 1:0:0 | 50.25 | 35 | 1.6 | | | 0.5 | | 1.5 | 9 | 0 | | | | |
| 11 | H | 1:0:0 | 50.25 | 35 | 1.6 | | | | 0.2 | 1.5 | 11 | 0 | 13 | 30 | 40 | |
| 12 | H | 1:0:0 | 50.25 | 35 | 1.6 | | | 0.5 | | 1.5 | 7 | 0 | | | | |
| 13 | H | 1:0:0 | 50.25 | 35 | 1.6 | | | | | 1.5 | 12 | 0 | | | | |
| 14 | H | 1:0:0 | 50.25 | 35 | | | | | | | | | | | | 1:12 |
| 15 | H | 1:0:0 | 50.25 | | | 1.5 | 2.25 | | | | 7 | 3.2 | | | | 3:12 |
| 16 | H | 1:0:0 | 50.25 | | | 1.5 | 2.25 | | | 1.5 | 11 | 0.64 0.8 | 7 | 42 | 82 | 3:35 |
| 17 | H | 1:0:0 | 50.25 | | | | | | | 1.5 | 20 | 0 | | | | |
| 18 | H | 1:0:0 | 50.25 | | | | | | | 1.0 | 25 | 0 | | | | 0:41 |

An invention has been provided with significant advantages. The dry high temperature fluid loss control additive of the invention can be dry blended with cement stored on the shelf or can be added to the mixing water at the well site. The novel additive of the inven-

* * * * *